INVENTOR.
WILLIS L. KIBLER

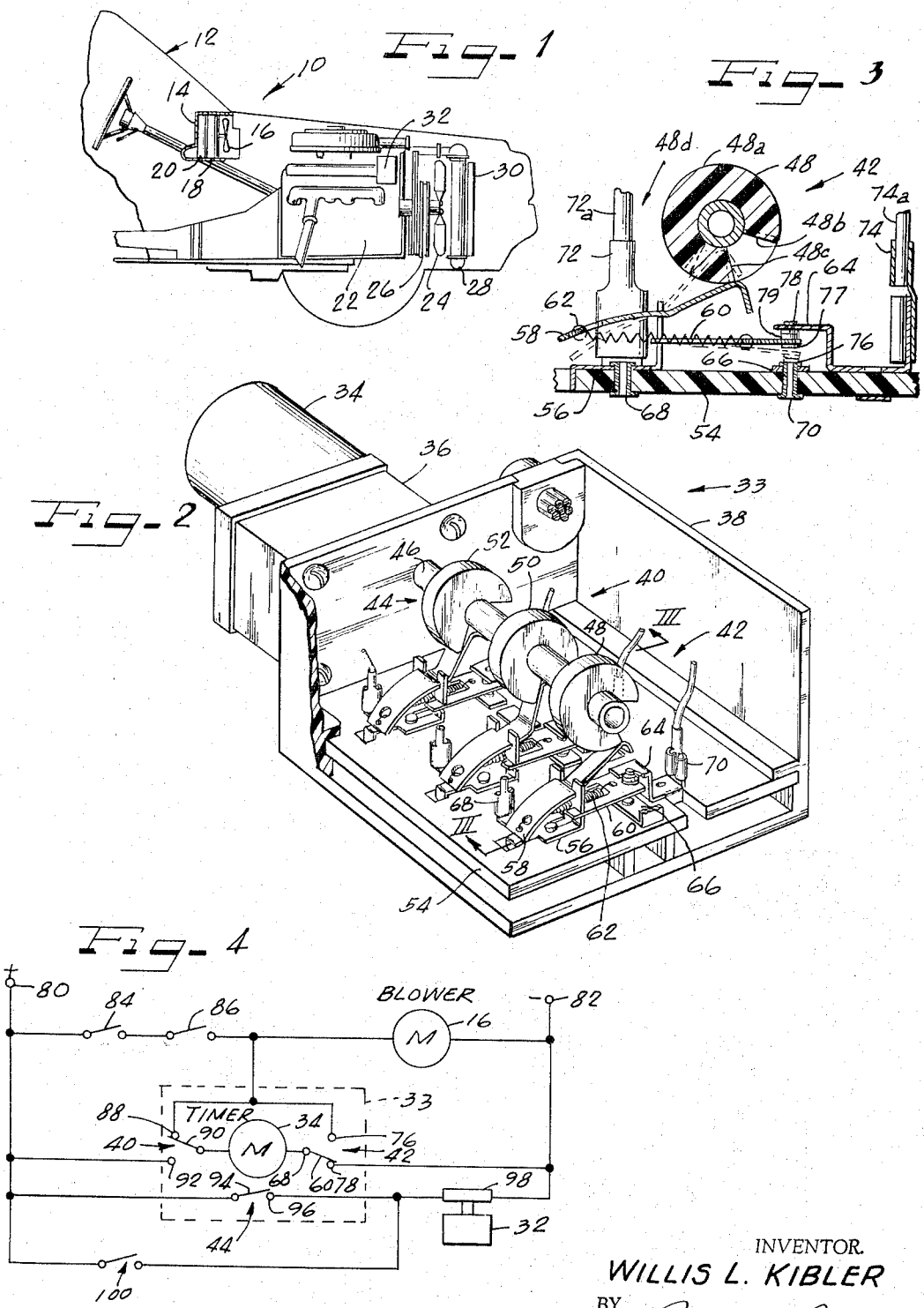

ATTORNEYS

United States Patent Office 3,363,671
Patented Jan. 16, 1968

3,363,671
AIR CONDITIONER AND DEFROSTER
SYSTEM
Willis L. Kibler, Detroit, Mich., assignor to The Delman Company, Cookeville, Tenn., a corporation of Tennessee
Filed Jan. 17, 1966, Ser. No. 521,175
11 Claims. (Cl. 165—2)

This invention relates generally to a method and apparatus for dehumidifying air passing through a blower of a vehicle windshield defrosting system and more particularly to a timer control unit employed in conjunction with a windshield defrosting system and an air conditioning system which initiates operation of the air conditioning system when the defroster system is first placed in use for dehumidifying air passing onto the windshield.

Whenever the defroster system of an automobile, or the like vehicle, is placed into operation, an initial fogging of the windshield is likely to occur depending upon the relative humidity of the air within the vehicle. In those vehicles having air conditioning systems which employ the same blower for both the air conditioner and the defroster, initial fogging of the windshield upon energization of the defroster system is very likely to occur after the air conditioner has been in use. Moisture accumulates on the cooling coils of the air conditioner during its use, which moisture will raise the relative humidity within the air conditioning and defrosting unit when the air conditioner is turned off. If the defroster is placed into use after the air conditioner has been in operation, the moisture on the cooling coils and in the air within the air conditioning unit will be blown onto the windshield by the common blower, causing fogging of the windshield. Such fogging of the windshield is, of course, highly undesirable.

A similar condition occurs when the heater of a vehicle has been in use and has cooled. The heat from the heater coils allows a greater percentage of moisture to be present in the surrounding air and, upon cooling, such moisture will form a condensation on the heater coils and surrounding structures. Therefore, if the same blower is employed for both the heater and the defroster, fogging of the windshield upon initiation of the defroster is very likely to occur.

It is evident that the problem is compounded when the same blower is employed for each of the air conditioner, the heater, and the defroster of a vehicle.

When separate blowers are employed for each of these systems, moisture will accumulate on the coils of both the heater and the air conditioner which will have a corrosive effect thereon. Furthermore, such multiplicity of blowers is costly and requires additional space. Therefore, several distinct advantages are realized by the use of one blower for each of the air conditioner, the heater, and the defroster. With a solution to the problem of windshield fogging in such common blower systems, therefore, many advantages are realized.

It is therefore, an object of the present invention to provide a method of dehumidifying air passing through a blower which is common to a windshield defrosting system and an air conditioning system, during use of the defrosting system.

It is another object of the present invention to provide an apparatus for initiating operation of the air conditioning system whenever the defroster of a vehicle is placed in operation in those systems which employ a common blower for both the defroster system and the air conditioning system.

It is still another object of the present invention to provide a method and apparatus for preventing fogging of a vehicle windshield during initial operation of the defroster system thereof and wherein a common blower is employed for the air conditioning and defrosting system thereof.

A further object of the present invention is to provide a method of dehumidifying air passing through a defroster system wherein a common blower is employed with the heater system of a vehicle.

An important feature of the present invention resides in the provision of a cam-operated switching circuit which provides energization for a predetermined time period of the air conditioning system in a vehicle whenever the defroster system is turned on.

Still another important feature of the present invention resides in the provision of a novel circuit arrangement in cooperation with the cam-operated control which operates a timer motor, the air conditioning system, and the common blower of both the defroster and the air conditioning system.

These and other objects, features and advantages of the present invention will be more fully realized and understood from the following detailed description when taken in conjunction with the accompanying drawings wherein:

FIGURE 1 is a side view diagrammatically illustrating a vehicle employing an air conditioning system, a heater system, and a defrosting system each having the same blower;

FIGURE 2 is a perspective view partially broken away of the timer control unit of the present invention;

FIGURE 3 is a sectional view taken along lines III—III of FIGURE 2;

FIGURE 4 is a schematic diagram of the circuit arrangement of the present invention.

Like reference numerals throughout the various views of the drawing are intended to designate the same or similar structures.

Figure 5A:
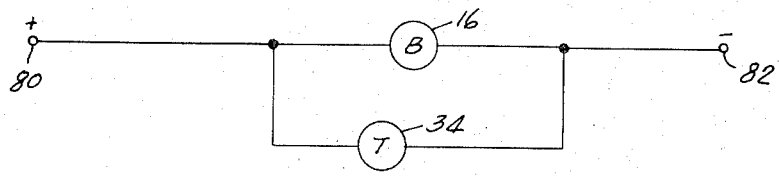
FIGURES 5A–5E illustrate a group of simplified circuit schematics showing the relative connection of the elements of FIGURE 4 during different sequences of operation of the timer control unit illustrated in FIGURE 2.

As shown in FIGURE 1, the outline of an automobile is generally designated with the reference numeral 10, and the outline of a windshield is generally designated with the reference numeral 12. A heat exchange unit 14 includes a blower 16, air conditioning cooling coils 18 and heater coils 20 in air circulating relationship with one another. The blower 16 is effective to draw air across the cooling coils 18 and heating coils 20 to provide either cooling or heating air to the interior of the vehicle 10. Suitable conduit and baffling means are provided for directing the air into the interior of the vehicle 10 and also for directing a stream of air onto the windshield 12 when it is desired to remove fog therefrom.

A motor 22 of the vehicle 10 drives a fan 24 by means of a belt 26 for drawing air through a radiator 28 of the vehicle 10. A condenser coil 30 is placed in front of the radiator 28 and forms part of the air conditioning system for the vehicle 10 through which air is drawn by means of the fan 24. The air conditioning system also includes a compressor 32 having an actuatable clutch connected for driving the compressor 32 from the motor 22.

When the air conditioning unit is in use, moisture accumulates in and around the coils 18, which moisture will be conducted to the windshield 12 when the defroster is operated, since the blower 16 is common to both the air conditioning system and the defroster system. Therefore, the present invention is concerned with a method and apparatus for energizing the air conditioning system upon initial operation of the defroster system to dehumidify the air conducted to the windshield by means of the blower 16. That is, operation of the air conditioning system will cause the coil 18 to remove moisture from the air drawn thereacross by means of the blower 16.

A timer control for performing such function is illustrated in FIGURE 2 and is generally designated with the reference numeral 33. The timer control 33 includes a timer motor 34 connected through a gear reduction unit 36 mounted on an exterior wall of a housing 38. Switch means 40, 42 and 44 are provided within the housing 38 and are actuatable by means of the timer motor 34. An output shaft 46 extends from the gear reducing unit 36 extends into the housing 38 and a plurality of cams 48, 50 and 52 forming part of the switch means 42, 40, and 44 respectively are mounted thereon for rotation.

Since each of the switch means 40, 42 and 44 are identical with the exception of the cams 48, 50, and 52 thereof, only the switch means 42 will be described in detail. Each of the switch means 40, 42 and 44 are mounted on a board 54 of Bakelite or the like material which is supported between the side and end walls at a spaced distance from a bottom wall of the housing 38. The switch means 42 includes a support member 56 which is secured to the panel 54 and includes a vertical portion which pivotally supports an actuating arm 58 thereon. The actuating arm 58 has one end thereof riding on a surface of the cam 48 and is actuatable in accordance with the configuration thereof.

A movable contacting arm 60 is mounted on the support 56. A spring 62 extends between the actuating arm 58 and the movable contacting arm 60 to provide movement of the contacting arm 60 in accordance with the movement of the actuating arm 58.

Secured to the panel 54 are contact supports 64 and 66 between which one end of the movable contacting arm 60 extends. As shown in FIGURE 3, the support 56 is secured to the panel 54 by means of a rivet 68 and the contact support 66 is secured to the panel 54 by means of a rivet 70. A terminal lug 72 engages a portion of the support 56 and has an electrical wire 72a extending therefrom for connection to appropriate circuitry. A terminal lug 74 engages a portion of the contact support 64 and has an electrical wire 74a extending therefrom to appropriate circuitry. The contact support 66 support a contact 76 which is disposed for being engaged by a contact 77 mounted on the movable contacting arm 60. Also, the contact support 64 supports a contact 78 thereon which is disposed for being engaged by a contact 79 mounted on the contacting arm 60.

Movement of the movable contacting arm 60 occurs whenever the actuating arm 58 is either released or depressed by means of the cam 48. The cam 48 includes a lobe portion 48a defined by a pair of shoulders 48b and 48c. When the cam 48 is rotated in a direction indicated by the arrowed line 48d, one end of the actuating arm 58 slides on the surface of the lobe 48a until the shoulder 48b passes over the end of the arm 58. At that point, the spring 62 biases the actuating arm 58 into the dotted line position shown in FIGURE 3, which causes the movable contacting arm 60 to move to the dotted line position shown therein to cause the contact 76 to be engaged by the contact 77. When the actuating arm 58 is engaged by the lobe 48a, the switch means 42 is in a depressed position, as shown by the full line outline in FIGURE 3, and the contact 79 engages the contact 78. The other switch means 40 and 44 are identical to the switch means 42 with the exception of the position of the respective shoulders on the respective cams 50, 52. As shown in FIGURE 2, switch means 42 and 44 are released at approximately the same time; switch means 40 is released while the switch means 44 is released and at the same time that the switch means 42 is depressed; and switch means 40 and 44 are depressed at approximately the same time. The sequence of actuation of the switch means 40, 42, and 44, however, will be explained in greater detail with respect to the operation of the circuit illustrated in FIGURE 4.

As shown in FIGURE 4, terminals 80 and 82 are disposed for connection to a source of current, such as an automobile storage battery. Connected in series between the terminals 80 and 82 is an ignition switch 84 of the vehicle 10, an accessory switch 86 for actuating the defroster system of the vehicle 10, and the blower motor 16. Therefore, when the ignition switch 84 and the accessory switch 86 are closed, the blower motor is actuated to blow air onto the windshield 12 through the cooling coils 18 and the heating coils 20. In order to dehumidify the air passing therethrough, the air conditioning system is energized to cool the coils 18 and allow removal of moisture from the air. Such energization of the air conditioning system is accomplished by the remaining circuitry shown in FIGURE 4, with the circuitry described including the ignition switch 84, the accessory switch 86, and the blower motor 16 being the conventional defroster circuit for automobiles and the like.

As shown in FIGURE 4, the timer control 33 includes the timer motor 34 and the switch means 40, 42 and 44. The switch means 42 is shown in the depressed position while the swtich means 40, 44 are shown in the released position. The circuit as illustrated in FIGURE 4 shows the relative position of each of the switch means 40, 42, and 44 at the end of one complete cycle when the defroster system has been turned off and ready for reuse.

As shown in FIGURE 4, the junction between the accessory switch 86 and the blower motor 16 is connected to the contact 76 of the switch means 42 and to a contact 88 of the switch means 40. The movable contacting arm 60 of the switch means 42 is connected to one side of the timer motor 34 and a movable contacting arm 90 of the switch means 40 is connected to the other side of the timer motor 34. A fixed contact 92 of the switch means 40 is connected to the terminal 80 and the fixed contact 78 of the switch means 42 is connected to the terminal 82. The switch means 44 includes a movable contacting arm 94 and a fixed contact 96 connected in series between the terminal 80 and the terminal 82 through a compressor clutch 98. The compressor clutch 98 actuates the compressor 32 upon energization thereof for initiating the operation of the air conditioning system. A compressor control switch 100 is connected in parallel with the switch means 44 for independent actuation of the compressor clutch 98.

When the ignition switch 84 and the accessory switch 86 are closed, the source of current on the terminals 80, 82 is connected in parallel across the blower motor 16 and timer motor 34. This arrangement of the respective switches provides energization of both the blower motor and the timer motor, as shown in FIGURE 5A. This condition exists for a relatively short time, sufficient only to bring the blower 16 up to operating speed to cause the passage of air through the coils 18. Therefore, this condition may exist for approximately five seconds as dictated by the shape of the cams 48, 50, and 52.

Figure 5B:
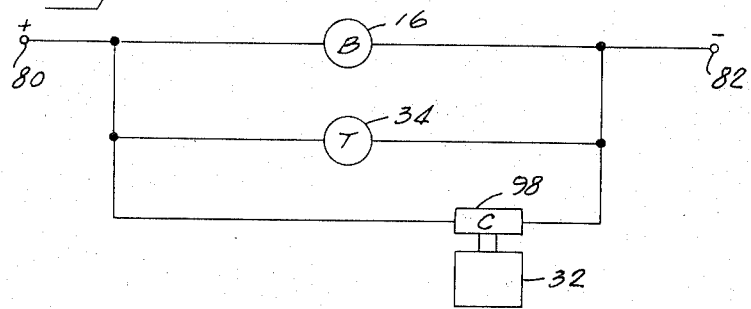

After the blower motor 16 has come up to its operating speed, and since the timer motor is running, switch means 40 and 44 are depressed to provide a circuit arrangement, as illustrated in FIGURE 5B. In this position of the respective switches, the source of current at the terminals 80, 82 is connected across the compressor clutch 98 causing energization of the compressor 32 and subsequent operation of the air conditioning system in the vehicle 10. The timer motor 34 continues to operate and the blower 16 continues to blow air onto the windshield 12. This condition of the respective switches continues for a time sufficient to permit dehumidification of the air surrounding the coils 18, 20. The moisture accumulated by the coils 18 is, of course, allowed to drain in the conventional manner. Operation of the air conditioning system continues for approximately two minutes to allow substantially complete dehumidification of the air passing through the coils 18.

Figure 5C:
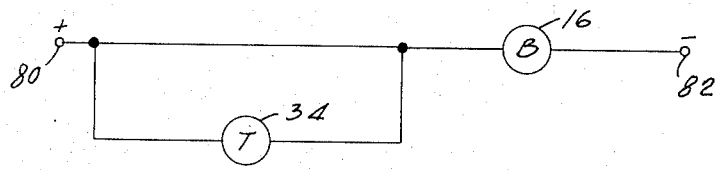

At the end of the two-minute time period, during which time the timer motor 34 is running, switch means 94 is released causing deenergization of the compressor clutch 98 to stop the compressor 32. Immediately following the release of switch means 44, switch means 42 is released. The position of the respective switches at such time provides a circuit arrangement, as illustrated in FIGURE 5C, wherein the timer motor is short-circuited by the ignition switch 84 and the accessory switch 86. Therefore, the timer motor is stopped and the blower motor 16 continues to operate. This latter condition continues during the remainder of the defrosting operation and until either the ignition switch 84 or the accessory switch 86 is open.

Figure 5D:
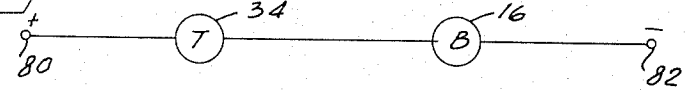
Figure 5E:
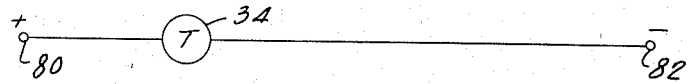

Opening of one of the switches 84, 86 removes the short circuit across the timer motor 34 and the timer motor 34 is again energized, as illustrated in FIGURE 5D. This operation resets the switching means 40, 42, and 44. At the end of the resetting cycle, switch means 42 is depressed to remove the blower motor 16 from the circuit, as illustrated in FIGURE 5E. The condition illustrated in FIGURE 5E continues until switch means 40 is released to stop the operation of the timer motor. At this point, the position of the respective switches is as shown in FIGURE 4, the original starting position of the timer control 33.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. The method of defrosting a windshield in a vehicle having an air conditioning system and a windshield defroster system each having the same blower with cooling coils in the air conditioning system in air communication with the blower, comprising the steps of
    energizing the blower and air conditioning system for a time period sufficient to allow dehumidification of air passing through the cooling coils, and
    maintaining the blower energized while deenergizing the air conditioning system during the remaining defrosting time.

2. The method as defined in claim 1 wherein the blower and the air conditioning system are energized for a time period of approximately two minutes.

3. The method as defined in claim 1 wherein the blower and the air conditioning system are energized for a time period of more than two minutes.

4. The method as defined in claim 1 wherein the blower and the air conditioning system are energized for a time period of less than two minutes.

5. The method as defined in claim 1 wherein the blower is initially energized for a time period sufficient to allow the blower to reach operating speed and to permit the passage of air through the cooling coils before energization of the air conditioning system.

6. The method as defined in claim 5 wherein the blower is initially energized for a time period of approximately five seconds.

7. In a vehicle having an air conditioning system and a windshield defroster system each having the same blower with cooling coils of the air conditioning system in air communication with the blower, a timer control in combination therewith comprising
    means for energizing the blower and air conditioning system for a time period sufficient to allow dehumidification of air passing through the cooling coils, and
    means for maintaining the blower energized and deenergizing the air conditioning system after said time period and during the remaining defrosting time.

8. The apparatus as defined in claim 7 wherein the vehicle includes a source of current and a defroster accessory switch connected in series with the blower across the source of current.

9. The apparatus as defined in claim 8 wherein said energizing means includes a timer motor and switch means operatively connected to said timer motor for connecting said timer motor in parallel with the blower and for connecting the air conditioning system across the source of current.

10. The apparatus as defined in claim 9 wherein said maintaining means includes second switch means for deenergizing said timer motor.

11. In a vehicle having an air conditioning system and a windshield defroster system each having the same blower, a timer control unit comprising
    a timer motor; and
    switch means operatively connected to said timer motor for energizing the blower and the air conditioning system for a first predetermined time period sufficient to allow dehumidification of air passing through the blower and for deenergizing the air conditioning system at the end of said first predetermined time period while maintaining the blower energized.

No references cited.

ROBERT A. O'LEARY, *Primary Examiner.*

C. SUKALO, *Assistant Examiner.*